(12) United States Patent
Tang et al.

(10) Patent No.: US 7,907,939 B2
(45) Date of Patent: *Mar. 15, 2011

(54) SYSTEMS, DEVICES AND METHODS FOR PROVIDING SERVICES IN A PROXIMITY-BASED ENVIRONMENT

(75) Inventors: Hong Da Tang, Pittsburgh, PA (US); Chanakya Damarla, Pittsburgh, PA (US); Mark Pollard, Pittsburgh, PA (US)

(73) Assignee: Innerwireless, Inc., Richardson, TX (US)

( * ) Notice: Subject to any disclaimer, the term of this patent is extended or adjusted under 35 U.S.C. 154(b) by 917 days.

This patent is subject to a terminal disclaimer.

(21) Appl. No.: 11/825,716

(22) Filed: Jul. 9, 2007

(65) Prior Publication Data

US 2007/0259653 A1 Nov. 8, 2007

Related U.S. Application Data

(63) Continuation of application No. 11/056,429, filed on Feb. 11, 2005, now Pat. No. 7,257,392, which is a continuation of application No. 10/081,260, filed on Feb. 22, 2002, now Pat. No. 7,139,557, which is a continuation of application No. 09/593,531, filed on Jun. 14, 2000, now abandoned.

(60) Provisional application No. 60/165,540, filed on Nov. 15, 1999.

(51) Int. Cl.
*H04M 11/04* (2006.01)
*H04Q 7/20* (2006.01)

(52) U.S. Cl. ............... 455/414.2; 455/404.2; 455/412.2; 455/456.1

(58) Field of Classification Search ............... 455/414.2, 455/404.2, 412.2, 456.1, 566–567, 432.3, 455/456.3, 457, 466, 414.1, 41.2, 414.3, 403, 432.1, 440, 443, 520; 370/277–278, 282, 328, 469, 528, 537; 340/829.36, 829.49

See application file for complete search history.

(56) References Cited

U.S. PATENT DOCUMENTS 4,845,504 A 7/1989 Roberts et al.
(Continued)

FOREIGN PATENT DOCUMENTS

WO   WO 99/48315   9/1999
(Continued)

OTHER PUBLICATIONS

International Search Report from PCT/US2000/30775 dated Mar. 22, 2001, 1 page.

*Primary Examiner* — Pablo N Tran
(74) *Attorney, Agent, or Firm* — Haynes and Boone LLP

(57) ABSTRACT

A system is provided for delivery of services to at least one mobile device adapted to communicate in a wireless manner including a plurality of communication/detection devices. Each of the communication/detection devices is adapted to detect the presence of the mobile device when the mobile device is within the range thereof. Each communication/detection device is adapted to communicate information between the mobile device and the communication/detection device when the mobile device is within the range thereof. The system includes at least one multiplexer in communication with at least one of the communication/detection devices and at least one server including content stored thereon to provide at least one service to the client program on mobile device. The server is in communication with the multiplexer. The service to be provided to the mobile device depends on which one of the plurality of communication/detection devices is in communication with the mobile device.

17 Claims, 16 Drawing Sheets

U.S. PATENT DOCUMENTS

| | | | |
|---|---|---|---|
| 5,095,532 A | 3/1992 | Mardus | |
| 5,185,857 A | 2/1993 | Rozmanith et al. | |
| 5,243,652 A | 9/1993 | Teare et al. | |
| 5,504,482 A | 4/1996 | Schreder | |
| 5,539,395 A | 7/1996 | Buss et al. | |
| 5,554,321 A | 9/1996 | Choy et al. | |
| 5,555,376 A | 9/1996 | Theimer et al. | |
| 5,559,520 A | 9/1996 | Barzegar et al. | |
| 5,570,085 A | 10/1996 | Bertsch | |
| 5,572,195 A | 11/1996 | Heller et al. | |
| 5,579,535 A | 11/1996 | Orlen et al. | |
| 5,627,549 A | 5/1997 | Park | |
| 5,636,245 A | 6/1997 | Ernst et al. | |
| 5,646,632 A | 7/1997 | Khan et al. | |
| 5,717,688 A | 2/1998 | Belanger et al. | |
| 5,796,727 A | 8/1998 | Harrison et al. | |
| 5,796,827 A | 8/1998 | Coppersmith et al. | |
| 5,806,018 A | 9/1998 | Smith et al. | |
| 5,812,865 A | 9/1998 | Theimer et al. | |
| 5,835,061 A | 11/1998 | Stewart | |
| 5,887,259 A | 3/1999 | Zicker et al. | |
| 5,898,831 A | 4/1999 | Hall et al. | |
| 5,903,548 A | 5/1999 | Delamater | |
| 5,909,183 A | 6/1999 | Borgstahl et al. | |
| 5,953,425 A | 9/1999 | Selker | |
| 5,969,678 A | 10/1999 | Stewart | |
| 5,983,091 A | 11/1999 | Rodriguez | |
| 6,069,896 A | 5/2000 | Borgstahl et al. | |
| 6,091,956 A * | 7/2000 | Hollenberg | 455/456.5 |
| 6,259,405 B1 | 7/2001 | Stewart et al. | |
| 6,281,811 B1 | 8/2001 | Ranzino | |
| 6,343,317 B1 | 1/2002 | Glorikian | |
| 6,347,095 B1 | 2/2002 | Tang et al. | |
| 6,349,203 B1 | 2/2002 | Asaoka et al. | |
| 6,442,394 B1 | 8/2002 | Valentine et al. | |
| 6,452,498 B2 | 9/2002 | Stewart | |
| 6,456,854 B1 | 9/2002 | Chern et al. | |
| 6,463,287 B1 | 10/2002 | Wegner | |
| 6,490,443 B1 | 12/2002 | Freeny, Jr. | |
| 6,505,046 B1 | 1/2003 | Baker | |
| 6,529,728 B1 | 3/2003 | Pfeffer et al. | |
| 6,535,132 B2 | 3/2003 | Waters et al. | |
| 6,587,835 B1 | 7/2003 | Treyz et al. | |
| 6,625,457 B1 | 9/2003 | Raith | |
| 6,647,269 B2 | 11/2003 | Hendrey et al. | |
| 6,650,902 B1 | 11/2003 | Richton | |
| 6,697,018 B2 | 2/2004 | Stewart | |
| 6,725,048 B2 | 4/2004 | Mao et al. | |
| 6,728,632 B2 | 4/2004 | Medl | |
| 6,759,960 B2 | 7/2004 | Stewart | |
| 6,836,667 B1 | 12/2004 | Smith, Jr. | |
| 7,009,556 B2 | 3/2006 | Stewart | |
| 7,176,834 B2 * | 2/2007 | Percy et al. | 342/357.07 |
| 7,409,233 B2 * | 8/2008 | Pritchard | 455/567 |
| 7,441,203 B2 * | 10/2008 | Othmer et al. | 715/774 |
| 7,477,892 B2 * | 1/2009 | Coward et al. | 455/414.1 |
| 7,643,834 B2 * | 1/2010 | Ioppe et al. | 455/456.3 |
| 7,710,290 B2 * | 5/2010 | Johnson | 340/825.49 |
| 2002/0171581 A1 | 11/2002 | Sheynblat et al. | |

FOREIGN PATENT DOCUMENTS

| | | |
|---|---|---|
| WO | WO 01/37597 | 5/2001 |
| WO | WO 01/43419 | 6/2001 |

* cited by examiner

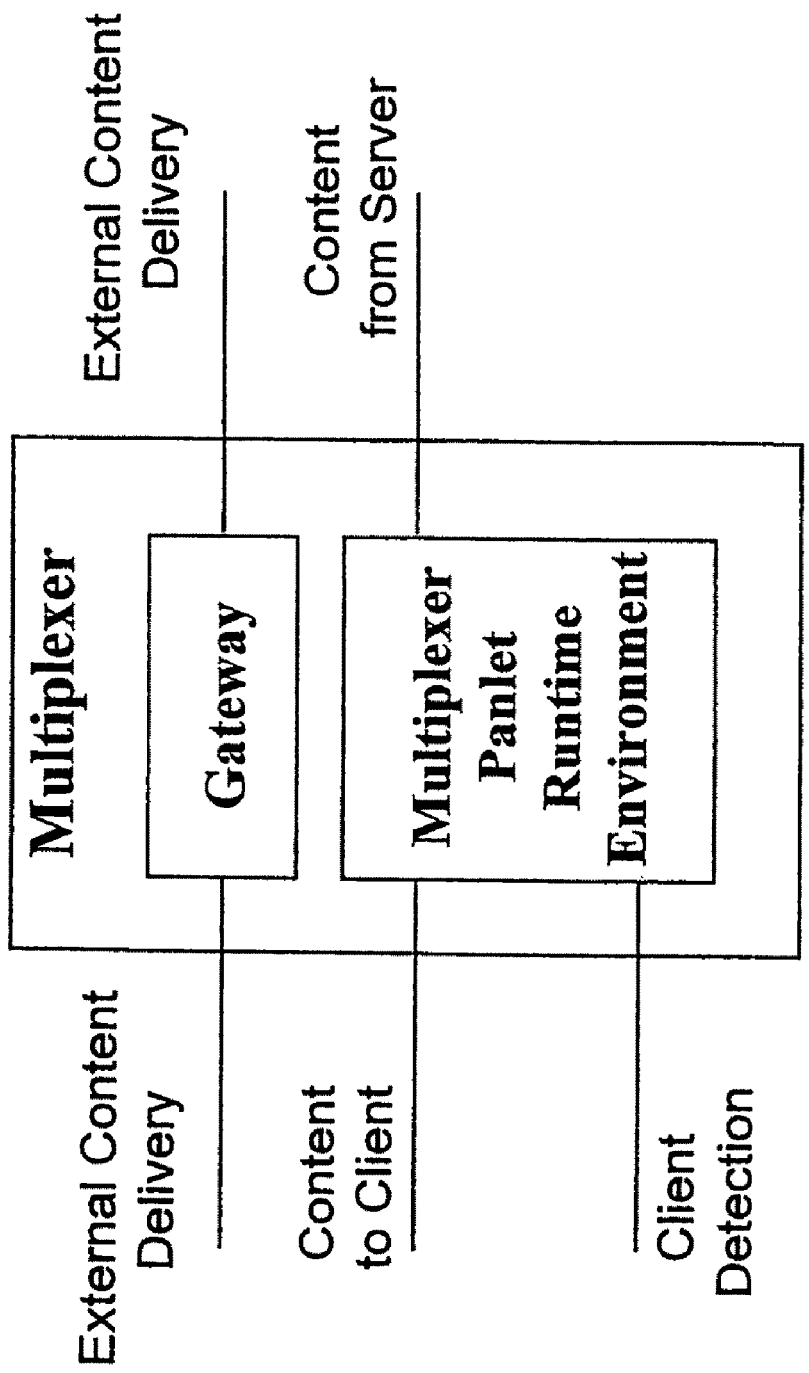
Figure 3.1

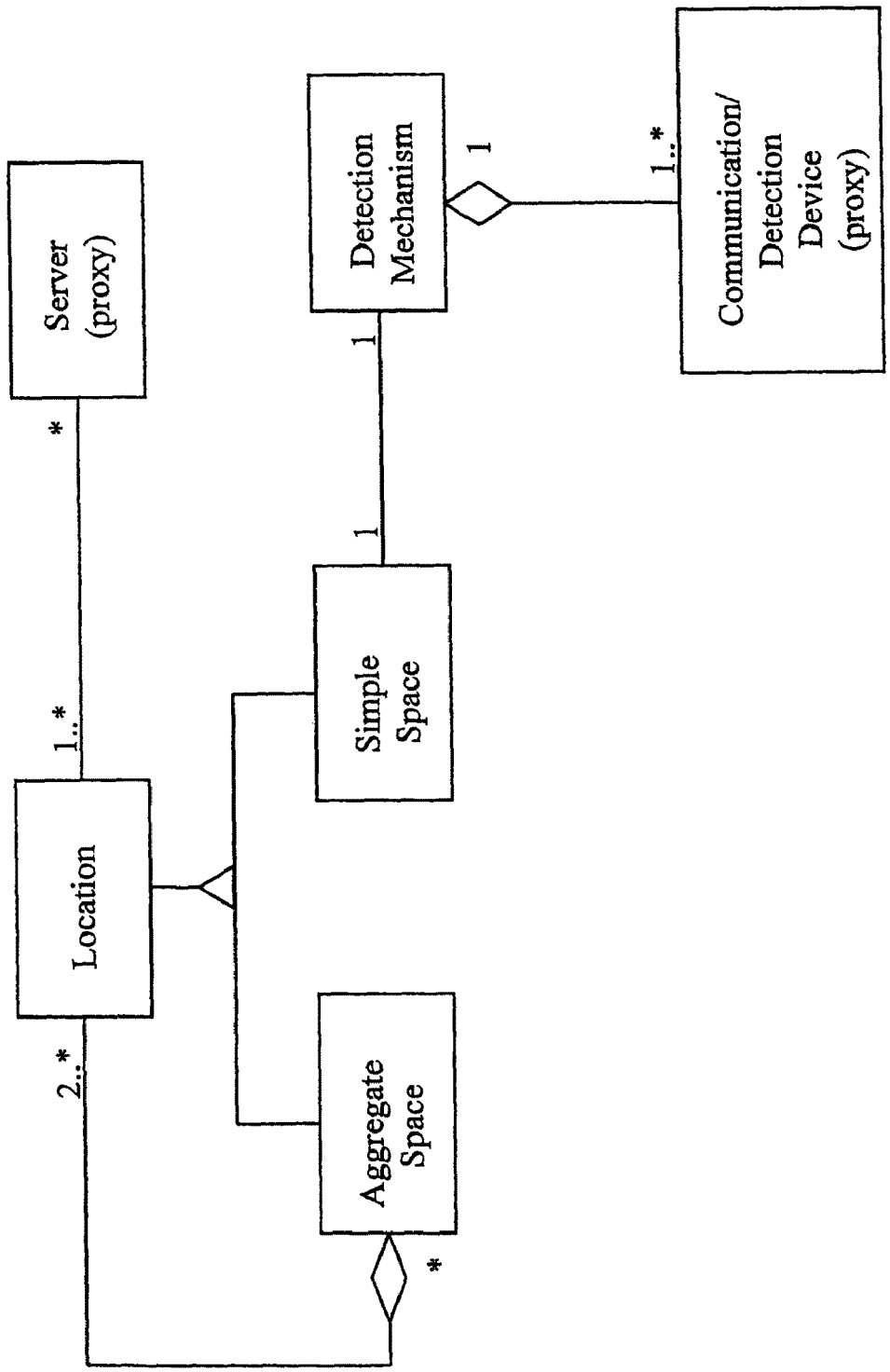
Figure 3.2

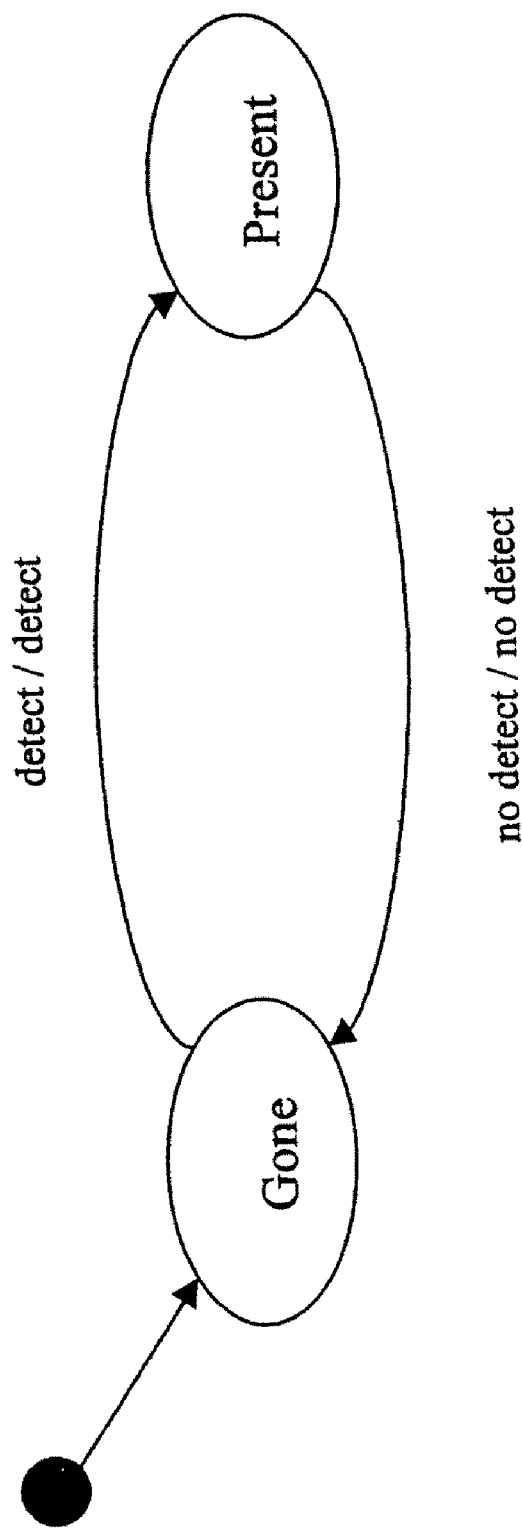
Figure 4.1

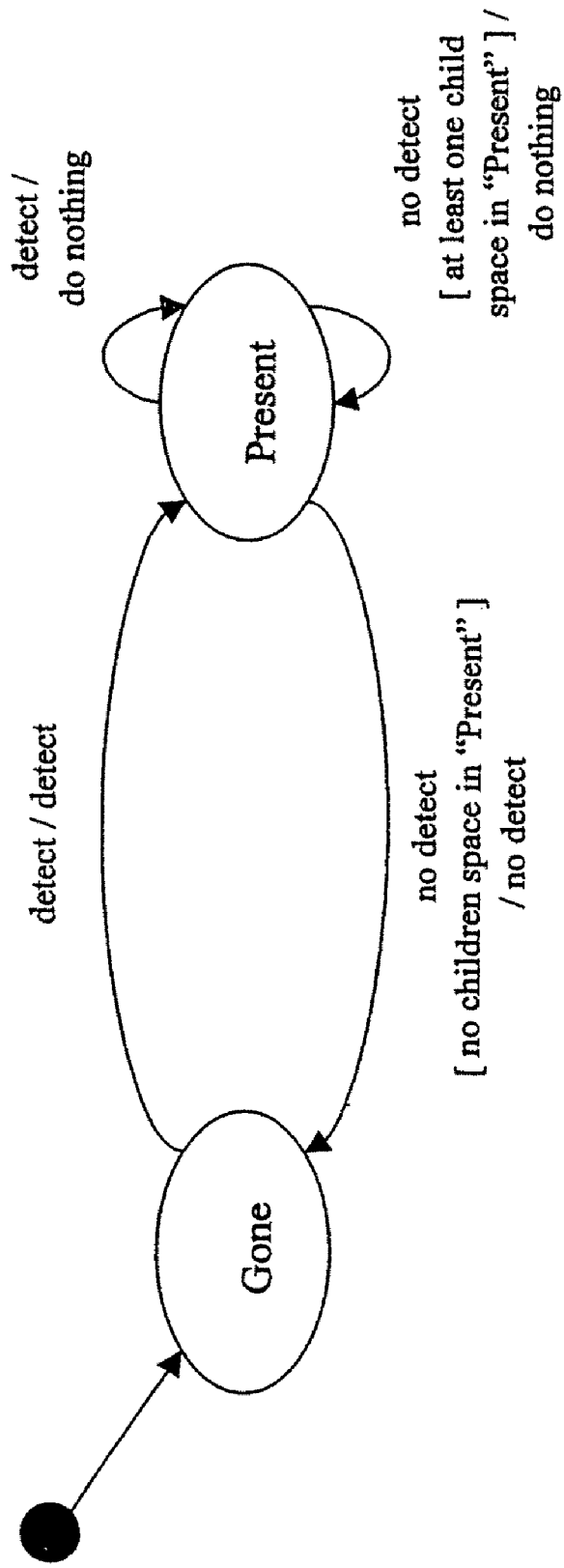
Figure 4.2

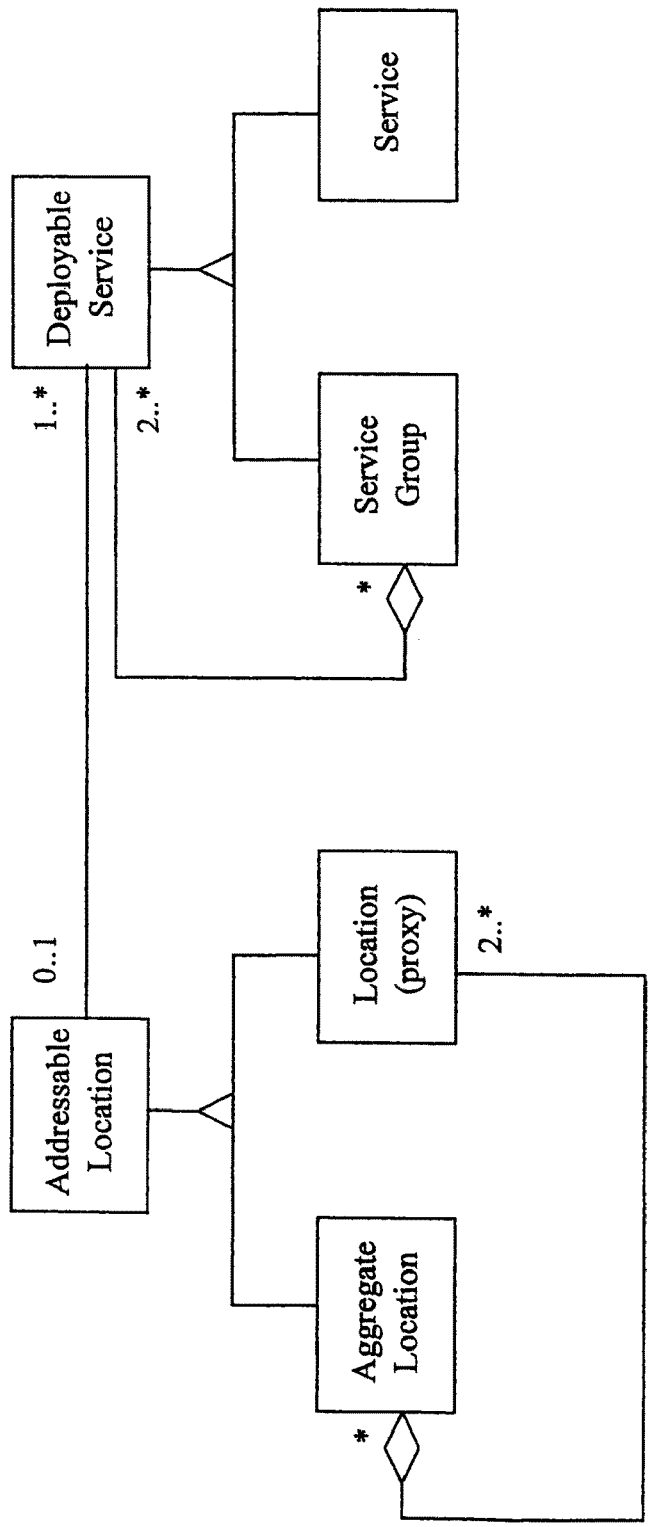
Figure 5.1

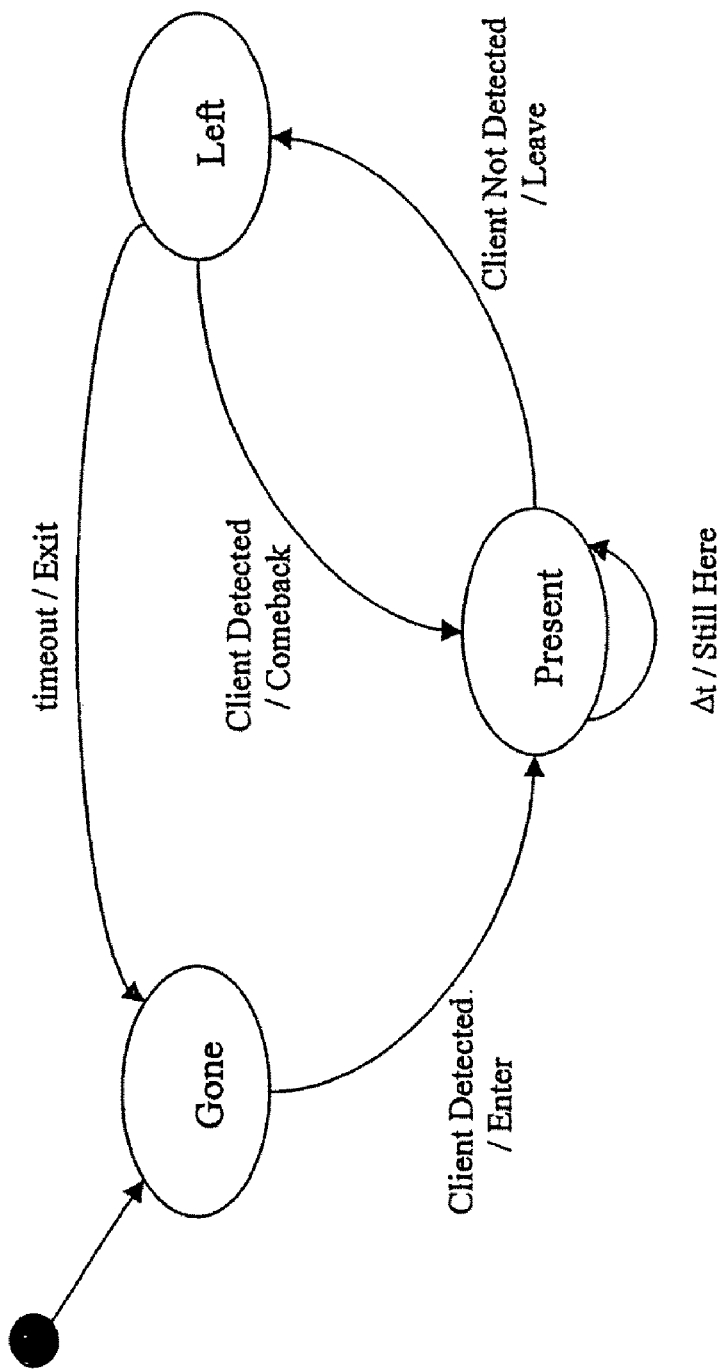
Figure 5.2

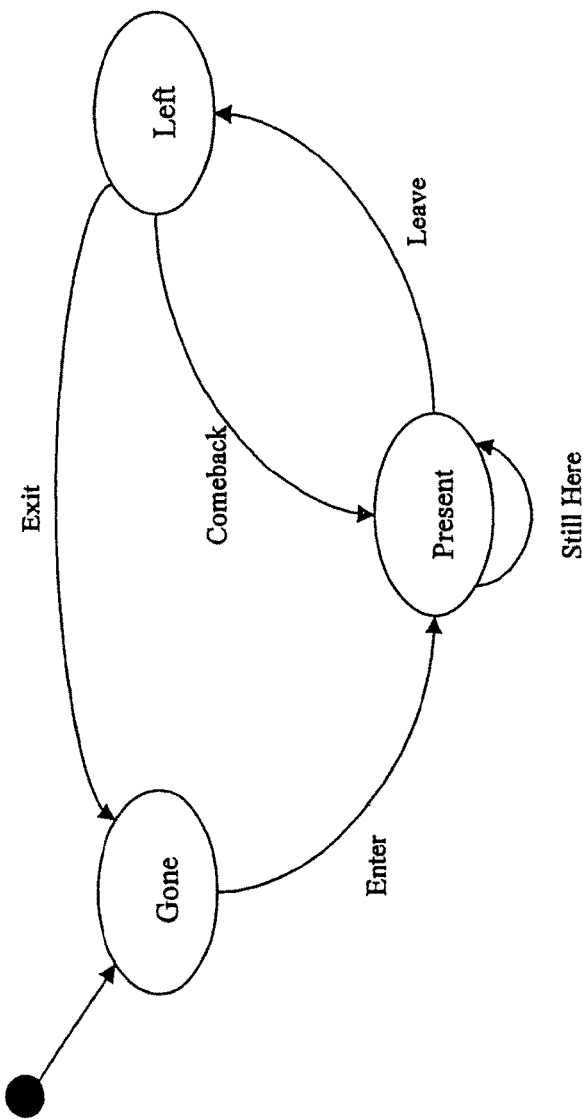
Figure 5.3
Consider all events as being implicitly parameterized by the same Client ID. The goal is that a Panlet instance will never receive multiple copies of the same event for the same client.

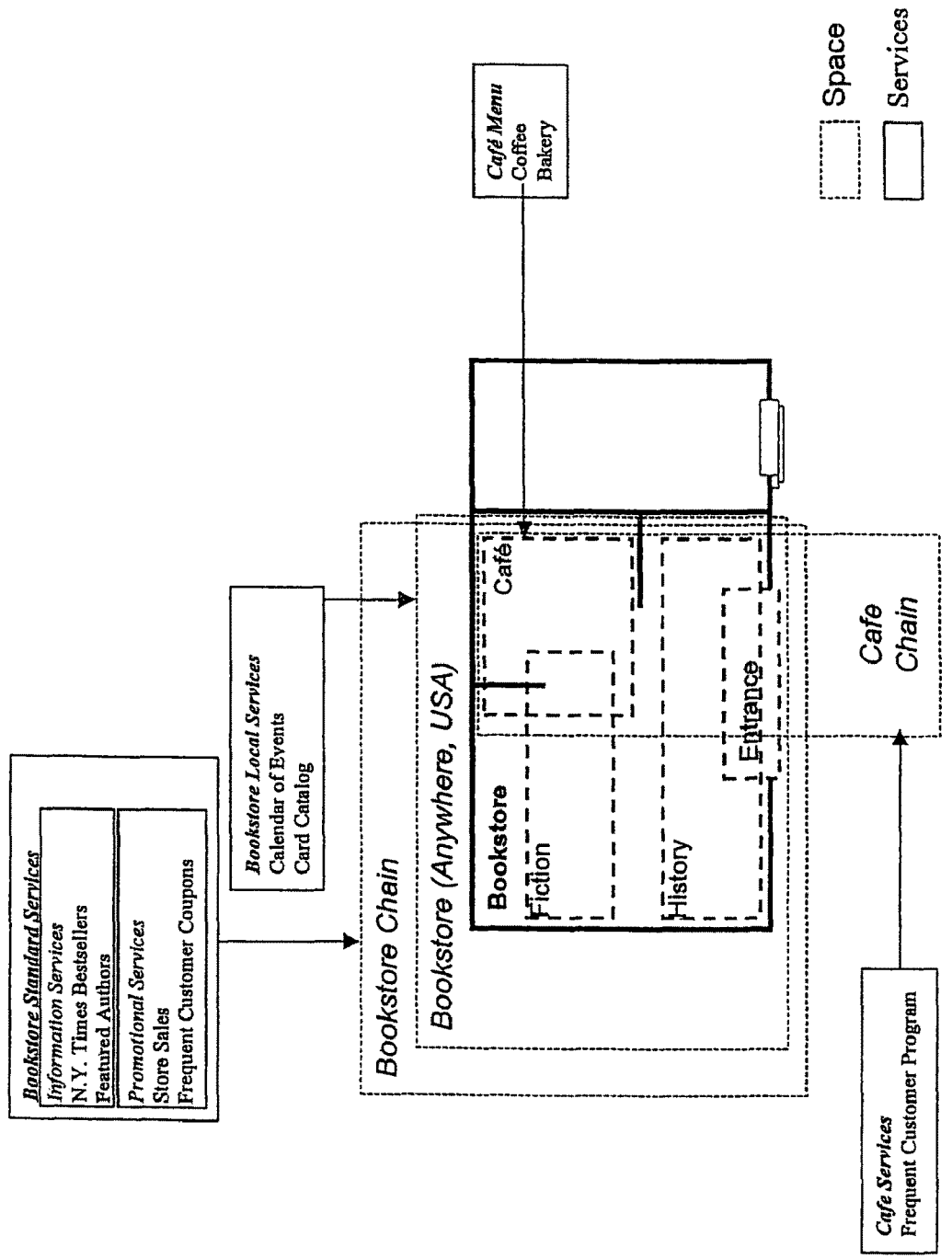
Figure 6.1

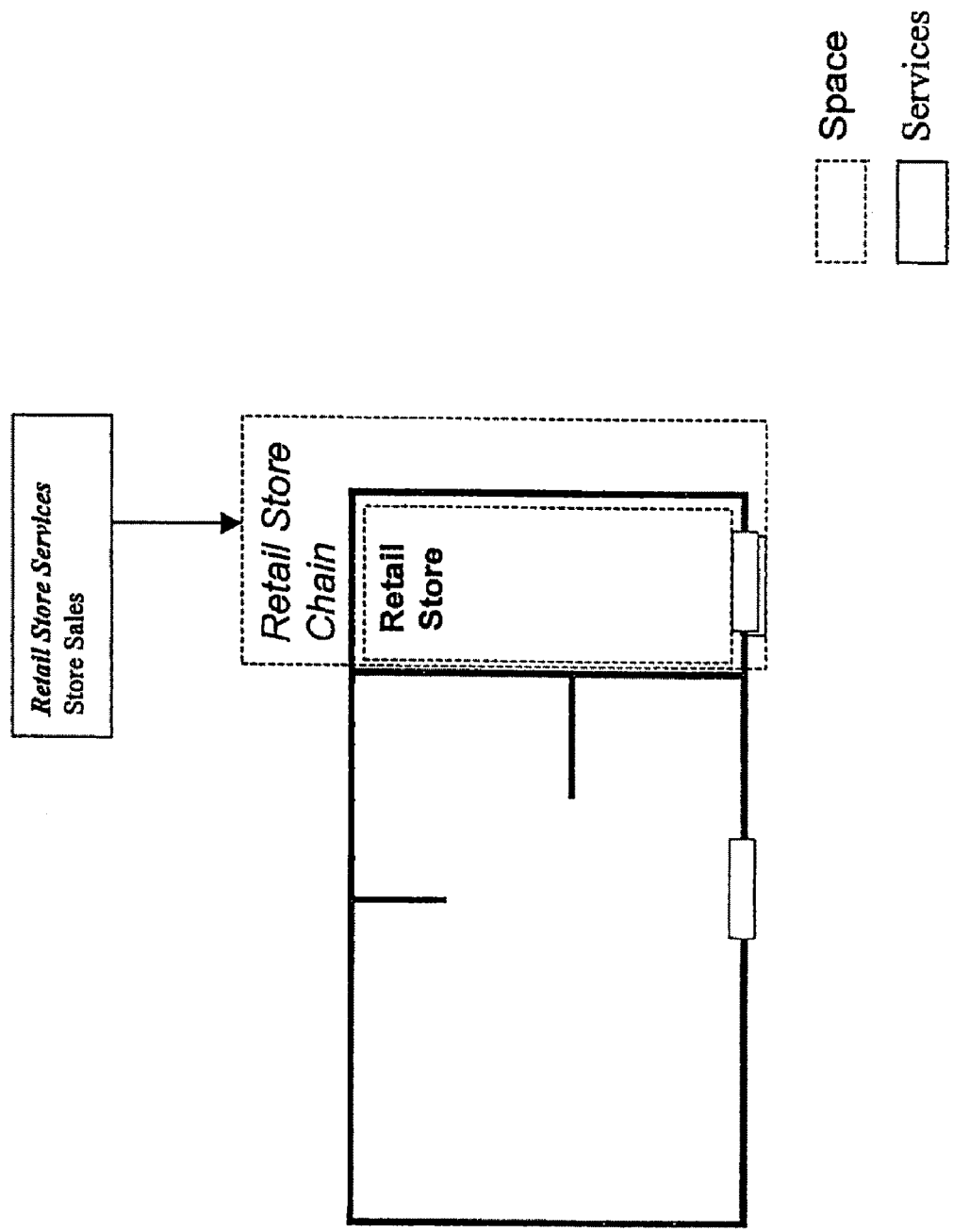
Figure 6.2

US 7,907,939 B2

SYSTEMS, DEVICES AND METHODS FOR PROVIDING SERVICES IN A PROXIMITY-BASED ENVIRONMENT

RELATED APPLICATIONS AND CLAIM OF PRIORITY

This application is a continuation of U.S. patent application Ser. No. 11/056,429 filed Feb. 11, 2005, which is a continuation of U.S. patent application Ser. No. 10/081,260 filed Feb. 22, 2002, which is a continuation of U.S. patent application Ser. No. 09/593,531, filed Jun. 14, 2000, which claims the benefit of U.S. Provisional Patent Application Ser. No. 60/165,540 filed Nov. 15, 1999, the disclosures of which are incorporated herein by reference. It should be noted that U.S. patent application Ser. No. 09/592,928 filed Jun. 13, 2000, which issued as U.S. Pat. No. 6,347,095 also claimed the benefit of U.S. Provisional Patent Application Ser. No. 60/165,540.

FIELD OF THE INVENTION

The present invention relates to systems, devices and methods for providing services in a wireless environment based upon a user's proximity with respect to predefined spaces and the user's profile and also to methods of defining spaces, services and service group and the relationship between spaces and services, including the relationships between groupings of spaces and services.

BACKGROUND OF THE INVENTION

Low cost information access devices (such as cellular phones and handheld computers) are becoming ubiquitous. Moreover, traditional laptops and personal computers are quickly evolving to more readily operate in a wireless environment. As these devices are able to directly and indirectly interact with each other over short-range, wireless communications systems (using, for example, radio frequency energy), a new class of proximity-based applications and services will be enabled.

The present invention provides a system in which actions of the system are initiated or triggered based on the users' proximity to predefined spaces.

In another aspect, the present invention provides a system in which a service provider maps physical space into areas that are proximity enabled, specifies the relationship between these areas, and defines the services that are associated with these areas.

SUMMARY OF THE INVENTION

In one aspect, the present invention provides a system for delivery of services to at least one client program on a mobile device adapted to communicate in a wireless manner. The system includes:

a plurality of communication/detection devices, each of the communication/detection devices having a known range, each of the communication/detection devices being adapted to detect the presence of the mobile device when the mobile device is within the range thereof and to communicate information between the mobile device and the communication/detection device when the mobile device is within the range thereof, and at least one multiplexer in communication with at least one of the communication/detection devices; and at least one server including content stored thereon to provide at least one service to the client program on mobile device, the server being in communication with the multiplexer, the service to be provided to the mobile device depending on which one of the plurality of communication/detection devices is in communication with the mobile device.

Preferably, the multiplexer intermediates communication between the server and the communication/detection devices so that the client of the mobile device does not require information of the communication path to the server and the server does not require information of the communication path to the communication/detection devices.

In general, at least one service group including at least one service is mapped by the server to be available to a physical space defined by-at least one communication/detection device. An aggregate space can be defined by a set of at least two physical spaces. The server can also map at least one service group to be available to the aggregate space. Likewise, a higher level aggregate space can defined as a set of aggregate spaces, and the server can map at least one service group to be available to the higher level aggregate space.

The physical space is preferably defined by a plurality of communication/detection devices. The multiplexer preferably includes a software program to determine whether the mobile device is within the physical space from detection information provided to the multiplexer by the communication/detection devices. Multiple servers can be in communication with the multiplexer.

In another aspect, the present invention provides a method of providing services to a client program running on a wireless mobile device. The method includes the steps of:

defining a physical space by location therein of at least one communication/detection device having a known range, the communication/detection device being adapted to detect the presence of the mobile device when the mobile device is within the range thereof and to communicate information between the mobile device and the communication/detection device when the mobile device is within the range thereof, and mapping at least one service group including at least one service to be available to client programs determined to be within the physical space. The service group can include a plurality of services.

The method can further include the steps of:

combining a plurality of physical spaces in a set to define an aggregate space; and mapping a second service group including at least one service to be available to client programs determined to be present within the aggregate space.

Likewise, the method can also include the steps of:

combining a plurality of aggregate spaces in a set to define a higher level aggregate space; and mapping a third service group including at least one service to be available to client programs determined to be present within the higher level aggregate space.

As discussed above, the physical space can be defined by multiple communication/detection devices. A software program preferably determines whether the mobile device is within the physical space from detection information provided to the software program by the communication/detection devices. In one embodiment, each of the physical spaces corresponds to departments within a place of business and the aggregate space corresponds to the entire place of business. Each of the physical spaces can also correspond to departments within a place of business, the aggregate space corresponds to the entire place of business, and the higher-level aggregate space corresponds to a plurality of places of business in a chain.

The present invention also provides a method of providing services to a client program running on a wireless mobile device including the steps of:

defining a physical space by location therein of a plurality of communication/detection devices having a known range, each communication/detection device being adapted to detect the presence of the mobile device when the mobile device is within the range thereof and to communicate information between the mobile device and the communication/detection device when the mobile device is present within the range thereof;

providing at least one server having at least one proximity-based application stored thereon, the proximity-base application being adapted to provide at least one service to be available to a client program stored on the mobile device when the mobile device is within the space, the service content being based upon higher level proximity-based events determined by periodic measurement of the presence or absence of the mobile device within the space; and providing at least one intermediary, the intermediary being in communication with the plurality of communication/detection devices and in communication with the server, the intermediary including a program to determine if the mobile device is present within or absent from the space from detection information provided by the plurality of communication/detection devices, the intermediary adapted to transmit the information of whether the mobile device is present within or absent from the space to the server.

In one embodiment, the proximity-based events include an enter space event, a still within space event, a temporarily left space event, a returned to space event, and an exited space event.

The content addressed from the server to the client on the mobile device is preferably transmitted to the intermediary for storage thereon and transmitted to the client upon request by the client.

In still a further aspect, the present invention provides a method of providing services to a client program running on a wireless mobile device including the steps of:

providing at least one server having at least one proximity-based application stored thereon, the proximity-base application being adapted to provide at least one service to be available to a client program stored on the mobile device when the mobile device is determined to be within a set of spaces including at least one space, the service content being based upon higher level proximity-based events determined by periodic measurement of the presence or absence of the mobile device within the set of spaces;

determining whether the mobile device is present within each of the spaces in the set of spaces using a plurality of communication/detection devices having a known range, each communication/detection device being adapted to detect the presence of the mobile device when the mobile device is within the range thereof and to communicate information between the mobile device and the communication/detection device when the mobile device is present within the range thereof; and providing the information of whether the mobile device is present within each space of the set of spaces to the server in a periodic manner to enable the server to determine the higher level proximity-based events.

The method preferably further includes the step of communicating content from the server to a client program on the mobile device via at least one of the communication/detection devices. Once again, the proximity-based events can include an enter space event, a still within space event, a temporarily left space event, a returned to space event, and an exited space event.

BRIEF DESCRIPTION OF THE DRAWINGS

FIG. 3.1 illustrates the subcomponents of an embodiment of a multiplexer in an unconnected mass with respect to FIG. 3.

FIG. 3.2 illustrates a partial object model of an embodiment of a multiplexer PRE.

FIG. 4.1 illustrates a state model of events for a simple space.

FIG. 4.2 illustrates a state model of events for an aggregate space.

FIG. 5.1 illustrates a partial object model of an embodiment of a server Panlet Runtime Environment (PRE).

FIG. 5.2 illustrates a state model of events for a service.

FIG. 5.3 illustrates a state model of events for a Panlet instance.

FIG. 6.1 illustrates the configuration of spaces and services in the Bookstore, which also contains a Caf.

FIG. 6.2 illustrates the configuration of spaces and services in the adjacent Retail Store.

DETAILED DESCRIPTION OF THE INVENTION

Proximity-based computing gives a user's mobile device, whether it is a cell phone, personal digital assistant (PDA), laptop, or other device, the ability to be aware of the user's environment. Proximity-based computing preferably gives the user the ability to interact with nearby devices and objects without overwhelming the user by the complexity of his or her environment.

Two fundamentally different kinds of entities are envisioned to be found in a proximity-based environment: (1) mobile devices and (2) location-bound devices offering services. Mobile devices include, for example, cell phones, PDAs, laptops and other similar devices carried around by the owner. Location-bound devices represent the infrastructure needed by the content/services providers to deliver their content/services to mobile devices as they come within communication range of the location-bound device(s). A proximity-based environment is described generally in U.S. Pat. No. 6,347,095 entitled SYSTEMS, DEVICES AND METHODS FOR USE IN PROXIMITY-BASED NETWORKING.

I. System Overview

Figure 1:
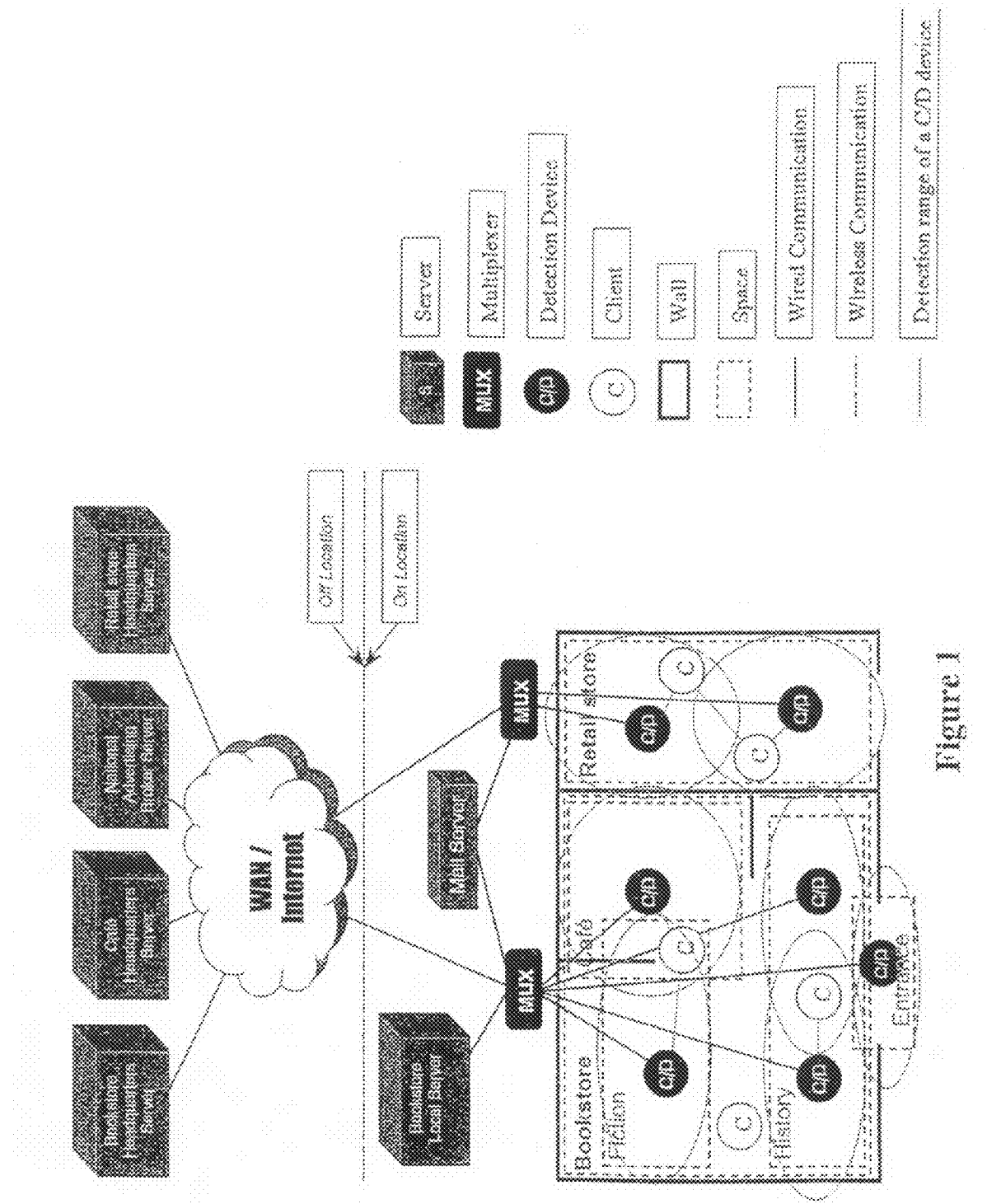
FIG. 1 illustrates a Bookstore and an adjacent Retail Store configured to support "proximity-based computing" in a mall.

FIG. 1 illustrates a Bookstore and an adjacent Retail Store configured to support a "Proximity Computing" environment in a Mall. Components that might be found in such an environment include Clients, Servers, Multiplexers, Communication/Detection Devices, wired communication lines, wireless communication channels, walls and artificial constructs termed space(s).

A. Client

A client C represents the software running on an end-user's mobile device (for example, a cell phone, a PDA, a laptop or a similar device). The client device is capable of wireless communication with other devices in its proximity.

The software needed to allow the mobile device to interact intelligently with other devices in its proximity may, for example, include:

1. Device drivers that are used to permit wireless communication via a hardware transmitter/receiver (for example, the Bluetooth™. Technology for digital radio frequency communication of the Bluetooth™ Special Interest Group as set forth in the Bluetooth™ SIG 1.0 available from www.bluetooth.com. The Bluetooth™ specification specifies a system solution comprising hardware, software and interoperability requirements and operates in a common 2.4 GHz ISM band.)
2. Low-level proximity aware services that are also used to establish and maintain wireless communication links (referred to herein as "proximity services").
3. Proximity runtime environment (PRE) software is responsible, for example, for retrieving service-related content, shielding the user from unwanted content, determining how much of a user's preferences to expose to its environment, etc.
4. A portal application that allows a user to interact with proximity-based services. The portal application can, for example, be a Graphics User Interface (GUI)-based interface (where sufficient screen real estate is available). The user interface can also be based on other media using, for example, touch or sound. It is through the portal application that users navigate among the various proximity-based services available in a given setting.

B. Communication/Detection Device

A communication/detection device is illustrated in FIG. 1 as a solid black circle with the label "C/D". It represents a proximity-based, location-bound device that is used to detect client devices as they enter its detection range and to forward this information to interested parties.

Communication/detection devices C/D are also used to facilitate two-way communication between a client device and a service wishing to offer content to any mobile devices in that communication/detection device's physical proximity. For example, a device C/D is used to detect mobile devices as they come into proximity and to then set up a higher level connection for example, (an IP-based connection) that allows a client to interact "directly" with a multiplexer (MUX) described in detail below. This higher-level communication will, for example, be relayed through device C/D's short-range wireless device (for example, a Bluetooth™ radio) to bridge the gap between the multiplexer, which may not be capable of wireless communication, and the mobile client, which is generally capable of only wireless communication (that is, the mobile client is cable free). Communication between the devices C/D and a multiplexer may, for example, be via a typical local area network or LAN. A communication/detection device C/D preferably runs a version of proximity services very similar to the version of proximity services running on the client.

C. Multiplexer

A multiplexer (MUX) is illustrated in FIG. 1 and serves as an intermediary between clients, communication/detection devices C/D and servers. A MUX preferably allows communication among such entities while shielding them from each other's details and complexity. Such an arrangement has certain benefits from the perspectives of both clients and servers. Benefit of such an arrangement include, but are not limited to the following:

1. Clients do not have to know how many servers are offering content in any given area or the location of the server(s). Servers can, for example, be "on location" (for example, in the Bookstore or in the Mall) and connect to multiplexers via a local area network or be off location and connect to multiplexers via a wide area network (WAN) or a global network such as the Internet. From the point of view of a client, a multiplexer presents a single point of interaction over which services are offered in a physical space. Whether one server or many servers are used to offer the services that a client sees is irrelevant to the client.
2. Clients do not have to know which services are available via which servers. All mapping is handled by the multiplexer. Content can be retrieved from the multiplexer without being concerned with the data path required to get that content from a server.
3. Servers do not have to know details about the type of communication/detection devices available in an area (this information is managed by multiplexers). Instead, servers have to know only that communication and detection services are available in an area.
4. In cases in which a client can be contacted via multiple communication/detection devices, the multiplexer can determine which path is optimal given current bandwidth restrictions. The possibility of alternative paths need not be known to the server. For example, in an area that has a high volume of client use and a large number of clients present, the same physical space may be served via multiple communication/detection devices simply to have enough active channels to handle the number of clients. In this case, the multiplexer determines which clients are contacted via which communication/detection devices.

A multiplexer is configured by a person familiar with the physical environment, a space maintainer. A space maintainer has two primary groups of responsibilities. First, a space maintainer has logical knowledge of the layout of physical spaces. For example, the client (located between Fiction and History spaces in the Bookstore of FIG. 1) who has no immediate contact with nearby communication/detection devices will be counted by a multiplexer as being present inside the Bookstore even though the client's presence can't be detected via any communication/detection devices. Further, in the case of FIG. 1, the multiplexer can consider a client to be still present in the Bookstore unless the last communication/detection device reporting detection of the client was the device positioned near the Entrance space (the only way to exit the Bookstore). Second, a space maintainer can group a set of communication/detection devices to serve a single space such that services can be directly provided to that space. A multiplexer may also be responsible for tying together the knowledge established about a client via multiple communication/detection devices into a single, coherent picture. This aggregation of communication/detection devices representing the same space is known as a detection mechanism. The multiplexer thus preferably has some understanding of spaces, how spaces are related to communication/detection devices, and where clients are in relation to spaces.

A multiplexer also serves as an indirection provider. Given the bandwidth restrictions on the logical link between clients and a multiplexer, it is preferable that the multiplexer not push new content across to clients simply whenever such content is available. Particularly in cases in which the client may not access content for a given service, or may not even open the portal application. As such, a multiplexer preferably queues content from services until the content is requested by the client for which it is destined. Once content is delivered to a client, it is preferably removed from the queue in the multiplexer.

Additionally, content is preferably staged as close (in terms of latency before getting the information) as possible to the client. Communication/detection devices are poor choices for such staging as they are likely limited in terms of available resources. Servers are potentially a few network hops away. This leaves the multiplexer as a reasonable place to stage content.

D. Server

A server is a host for a number of services. Preferably, servers shield the services as much as possible from having to about the topology of the various types of connections that are required to provide content from a service to clients. In addition to the services residing on the server, the server will contain a proximity runtime environment (PRE) that manages the proximate world as seen by the server. The server PRE preferably:

1. Manages its world view from the perspective of what services are available on the server and how they relate to the spaces. It also preferably determines how much of this world view to expose to clients as it becomes aware of them.
2. Determines which services should be informed of new clients upon detected activity.
3. Determines to which multiplexer to route service content in cases in which alternate paths via multiple multiplexers are possible.

E. Proximity Framework

Figure 2:
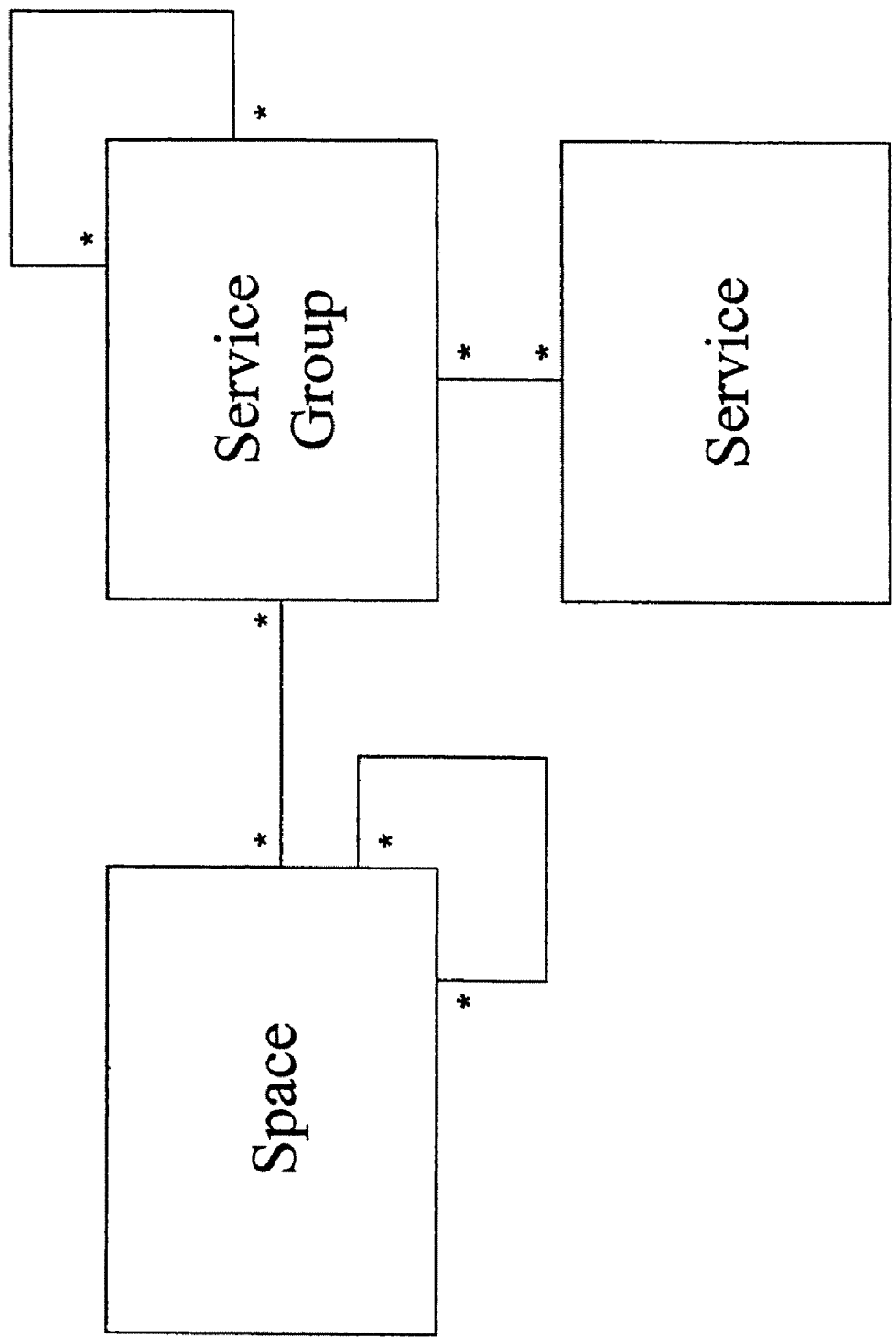
FIG. 2 illustrates a model that specifies relationships between spaces, service groups, and services.

The proximity-enabled world can, for example, be explained in terms of three basic concepts: spaces, services and service groups. FIG. 2 illustrates a "world view" model that specifies relationships between spaces, service groups, and services.

1. Space

A space is an abstraction of a physical area in the real world. Spaces preferably come in two varieties: simple spaces and aggregate spaces. Simple spaces are associated directly with a specific physical area, and typically correspond to a continuous area. Simple spaces may overlap each other. In contrast, an aggregate space is defined in terms of a set of child spaces that may be geographically separated or continuous. Examples of simple spaces include a department in a retail store, a conference room at a hotel, or the area around a sculpture exhibit at a museum. Two examples of aggregate spaces are a chain of department stores and a department store composed of the simple spaces corresponding to the different departments in the store. The services available to a user are a function of the spaces that the user is currently occupying.

2. Service

A service is an application that provides proximity-triggered content targeted to particular locations. The content available to a user will change as the user enters and exits spaces, and based on the user's movement within spaces. For example, a customer may receive an electronic greeting summarizing the day's discounts when entering a department store, or be asked if the client would like to speak with a sales person if the client spends an extended period of time in front of one display.

3. Service Group

A service group is a set of related services or service groups. Services groups provide a way for organizations to package services that will very likely be targeted to the same set of locations or to the same sorts of clients. For example, an airline might define two separate service groups so that it can provide one set of services to its typical customers, and an augmented set to its "frequent flyers." A particular service may be included as part of more than one service group. Service groups may be part of other service groups as well.

Figure 3:
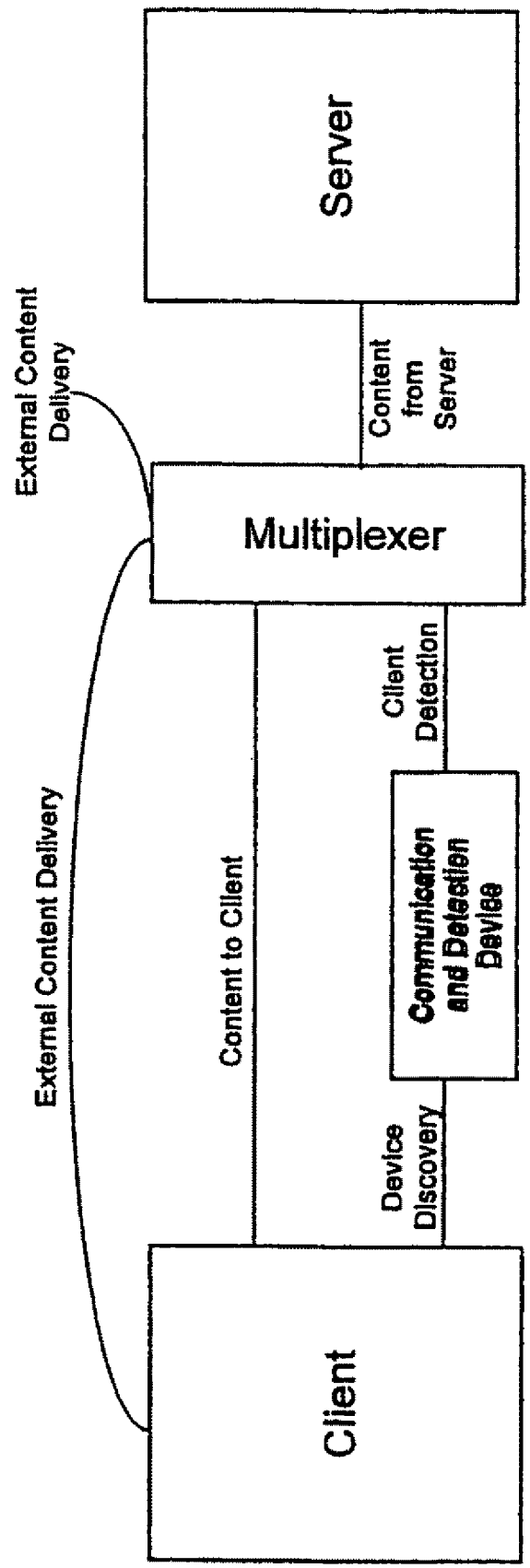
FIG. 3 illustrates a component and connector diagram for an embodiment of a proximity framework.

FIG. 3 illustrates a component and connector diagram for the proximity framework. This diagram illustrates primarily software components and how the software components interact at a high level of abstraction.

Most components' definitions and functionalities were discussed in connection with FIG. 1 and FIG. 2. The connectors set forth in FIG. 3 can be described as follows:

Device Discovery: A device discovery connector deals with the low level discovery and/or communication protocols used by communication/detection devices to detect client devices. As clear to one skilled in the art, such low level discovery and communication protocols can vary with communication/detection technology.

Client Detection: A client detection connector deals with how a multiplexer is made aware of clients as they are detected.

Content from Server: Content from server connector is primarily concerned with getting service generated content from a server to the multiplexer. Content from server refers generally to pages of information generated by services that are tied to one of, for example, five proximity events (described below) and to a specific service. This type of page is understood by the proximity framework, and is delivered to clients as described herein. Each page of service-generated content is preferably generated for a specific client, allowing services to tailor content to clients. The five proximity events are events that are triggered by the proximity framework and have proximity specific meaning. The five proximity events are the following:

A. Enter: This event indicates that a client has entered an area in which services are available, and those services should be informed that they may now offer content to the client.

B. Still Here: This event indicates that a client is still present in an area in which services are available. It merely indicates that the client has not left, and serves as a heartbeat of sorts that allows additional content to be offered over time as a client remains in an area.

C. Leave: This event indicates that a client has left an area in which services are available, but that the client could still comeback. That is, it hasn't been gone so long that it is inconceivable that the client device's user could simply step back into range.

D. Comeback: This event indicates that a client device has returned to an area of service that it had recently left (Leave).

E. Exit: This event indicates that the client is considered to have been gone from an area of service for such a period of time that it can be deemed not to be coming back anytime soon.

Content to Client: Content to client connector is primarily concerned with getting service-generated content that is staged at a multiplexer to a client when the client is ready for it.

External Content Delivery: External content delivery connector is used to get external content to clients on request. It may also be used to allow clients to provide information to services by means of filling out a form sent back to the service residing on the server (by means of the server being the external entity in this case). External content refers to pages of information that are not tied to the five Proximity events, but that may be accessible via links in the pages tied to the five Proximity events.

II. Multiplexer Architecture

In this embodiment, a gateway sub-component encompasses everything else in the server component. The gateway sub-component is preferably responsible for all interactions over the Client Detection connector, Content from Server connector and Content to Client connector. Further, it routes all external content communications between Client and external context sources.

FIG. 3.1 illustrates the sub-components of the multiplexer of FIG. 3 unconnected from the other components of FIG. 3 (that is, in an unconnected mass), with the multiplexer's use of connectors refined to show which sub-component uses each connector. The contents and purpose of each sub-component are summarized below:

A. Gateway

The gateway is used to relay requests for external content to, for example, the Internet. One skilled in the art will appreciate that gateway component protocol is not limited to WAP. For example, the gateway component protocol can be http etc.

B. Multiplexer Panlet Runtime Environment (PRE)

The Multiplexer PRE preferably facilitates communication between clients and services that is proximity specific. Things such as knowledge of world views (that is, a specific instance or instantiation of relationships between spaces, services and service groups), understanding of the semantics of content associated with the five proximity events, mappings between communication/detection devices and detection mechanisms (that is, a group of communication/detection devices defining a single simple space), and mappings of detection mechanisms to spaces are managed therein. The multiplexer PRE is generally significantly different from the PRE's running on either clients or servers.

A significant amount of information preferably can be managed by the multiplexer. Examples of data retained in are summarized as follows:

1. Knowledge of all simple spaces managed by the multiplexer and which detection mechanisms cover each simple space.
2. Knowledge of how multiple communication/detection devices are mapped to detection mechanisms.
3. Knowledge of any aggregate spaces and which other aggregate spaces and simple spaces are included in aggregate spaces.
4. Knowledge of which servers are interested in which spaces.
5. Knowledge of what each server intends to do with client data, should it receive client data (that is, a client profiles/server intentions model).
6. Knowledge of which clients (if any) are currently present in each space.
7. Knowledge of which services are currently available to each client currently present in at least one space (i.e., the accumulated world view for each client).
8. Knowledge of what pages of service-generated content are available for each client.

FIG. 3.2 illustrates an object model depicting part of the Multiplexer PRE. The object model is focused on the relationship between communication/detection devices and detection mechanisms, the mapping of detection mechanisms to simple spaces, and the relationships among spaces.

The communication/detection devices are preferably not mapped directly to simple spaces. Instead, only detection mechanisms are preferably mapped to simple spaces. A primary reason for this is to allow multiple communication/detection devices to be aggregated into a single detection mechanism, which serves a simple space. There are two primary benefits for this type of mapping. First, one may want to collect different types of data from different types of communication/detection devices (for example, infrared and Bluetooth™) that cover the same physical area into a single detection mechanism. This would result in a more knowledgeable source of information (likely using different technologies) that presents a single representation or point of interaction for that physical area. Second, one may want to group multiple similar communication/detection devices to present a single interface to a larger physical space than any single communication/detection device could cover. By hiding the multiple communication/detection devices behind a single detection mechanism, one does not permit services to be bound to any of the smaller areas covered by a single communication and detection device.

Communication/detection devices are preferably not part of a multiplexer. Preferably, there is a proxy of the communication/detection device in a multiplexer.

Detection mechanisms are mapped directly (one-to-one) with a simple space. Aggregate spaces can then be composed from other spaces, simple or aggregate. This mapping permits a site administrator (someone who can configure the multiplexer managing all the communication and detection devices in an area) to present different kinds of spaces for different needs. This can, for example, mean grouping adjacently located simple spaces into aggregate spaces that represent a larger, contiguous area, or it can mean grouping related simple spaces into an aggregate space that represents all areas with similar interests. It is an arbitrary grouping mechanism for which exact uses are generally tied to needs.

Both types of spaces, simple and aggregate, are considered locations to which services can be tied or addressed. Preferably, locations are visible to servers, not communication/detection devices and detection mechanisms. The multiplexer, therefore, preferably ensures that all clients that are detected by a communication/detection device must result in the appropriate services on servers being notified of the client detection. To do this (which is somewhat complicated by the different kinds of grouping managed by the multiplexer) the multiplexer must propagate detection notices from entity to entity in this model, performing the appropriate filtering along the way so that a service won't be informed multiple times when a client device enters locations in which the service offers content. That is, a service only wants to be informed if it should offer a client content, not that a client is within two or more overlapping sub-locations of a location in which the service is offering content.

D. Proximity Event Propagation

Figure 4:
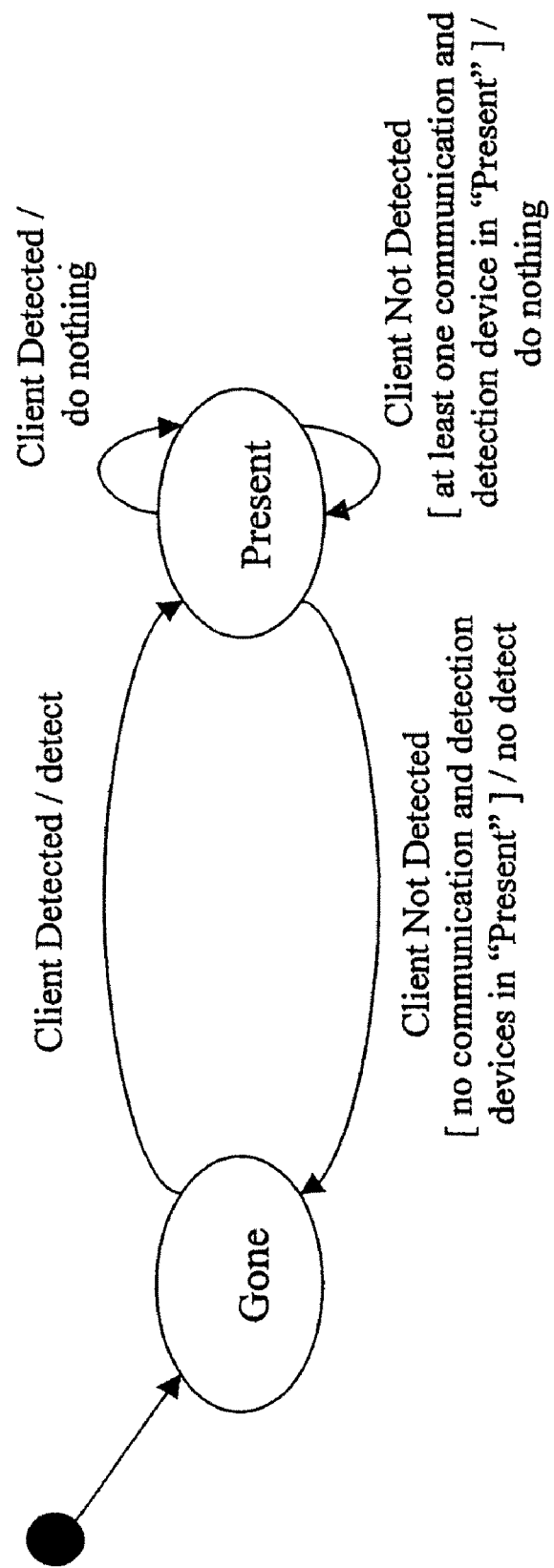
FIG. 4 illustrates a state model of events for a detection mechanism.

Proximity event propagation in FIG. 4 illustrates the manner in which a detection mechanism handles notifications from the communication/detection devices that it represents for the case that communication/detection devices form a perfect proximity detection coverage over the simple space. If none of its communication/detection devices can detect a client, then there is no client detectable by the detection mechanism. If at least one of its communication/detection devices can detect a client, then that client is detectable by the detection mechanism. Whenever a detection mechanism first detects or can first no longer detect a client, it will inform the simple space with which it is associated. In cases where the actual deployment of communication/detection device(s) does not form a perfect proximity detection coverage over a simple space, the state model of events for a detection mechanism should adapt to best accommodate the situation. All the state models presented represent the state that is maintained with respect to a single client. In reality, the state a communication and detection device can be thought of as the state of all clients as detected by the communication/detection device. The state of the communication/detection device is thus represented by an arbitrary number of parallel state machines, each of which is generally as illustrated in FIG. 4.

The propagation continues in FIG. 4.1 with an illustration of how simple spaces can deal with client detection. It is an even simpler model than set forth in FIG. 4, since a simple space can only be associated with one detection mechanism. Whenever a detection mechanism detects a client, so does the simple space. The same applies for lack of detection. Upon detection or lack of detection, a simple space preferably informs any aggregate spaces that are parent spaces. It also preferably informs any servers that have expressed an interest in that location.

While propagation to a server can occur via a simple space, it can also occur via an aggregate space. FIG. 4.2 shows how an aggregate space can handle detection and lack of detection. Its model is very similar to that of a detection mechanism. Like the detection mechanism, an aggregate space can be composed of an arbitrary number of sub-spaces. As such, detection of a client by an aggregate space equates to whether or not any of the sub-elements can detect the client.

III. Server Architecture

Figure 5:
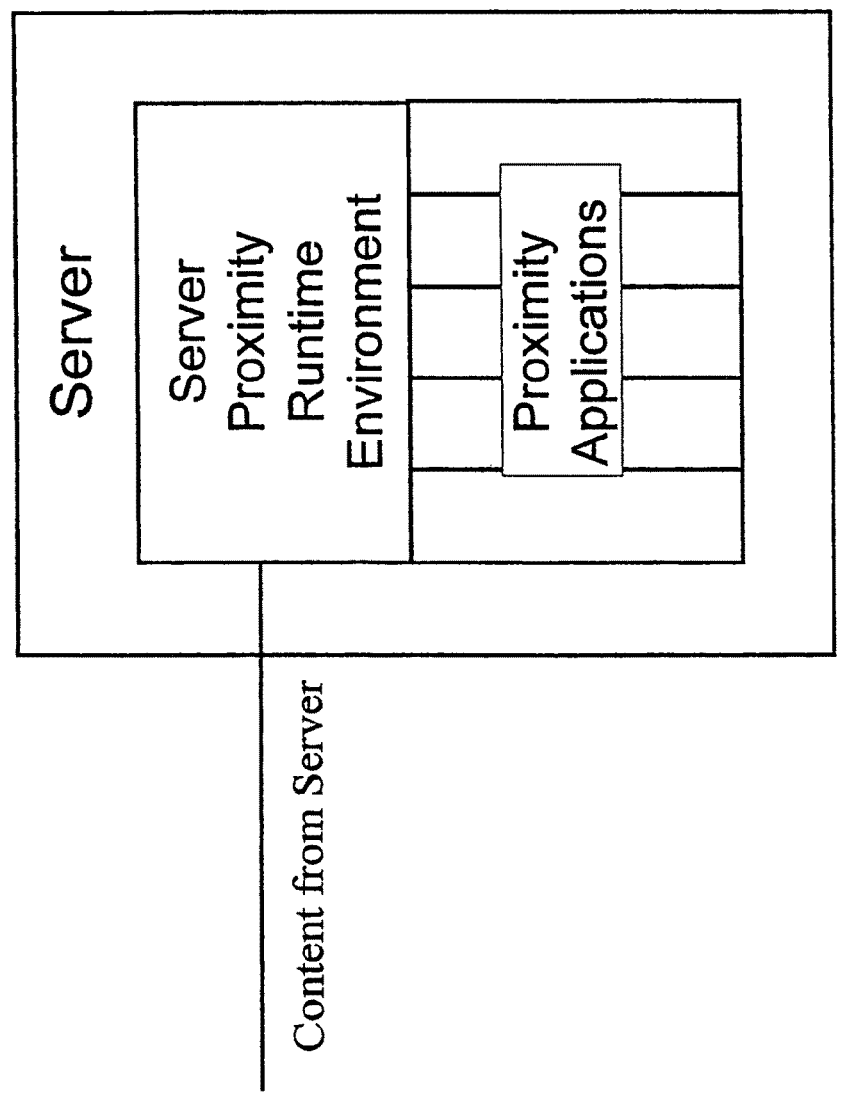
FIG. 5 illustrates the subcomponents of an embodiment of a server in an unconnected mass with respect to FIG. 3.

FIG. 5 shows the sub-components of a server component and the general arrangement of those subcomponents. Further, the server's use of connectors is refined to show which sub-component uses each connector. The contents and purpose of each sub-component in this embodiment are summarized below:

A. Server

In this embodiment, a third party server sub-component encompasses everything else in the server component. The third party server sub-component is preferably responsible for all interactions over the Content from Server connector, and routes all incoming communications to the server PRE.

A server preferably provides an additional benefit to proximity-based applications, and serves as their only means of getting feedback from clients. If a proximity-based application wants to request information from a client, it can, for example, provide a form for the client user to complete. This information can then be sent back to the proximity-base application by means of the External Content Delivery connector.

B. Server PRE

The server PRE encompasses a lot of intelligence in terms of keeping services aware of changes in client presence (that is, as clients move in and out of spaces), and using client preferences to determine whether or not to make services aware of a client. The server PRE is also preferably responsible for informing multiplexers of the server's intentions for use of client preferences/profiles, which can be compiled based upon the intentions of the services hosted on the server. Additionally the server PRE preferably generates world view information that is tailored for specific clients and sends this information to the appropriate multiplexer(s).

The server PRE is preferably the primary source of stimulation for proximity-based applications. It can keep track of the state of clients with respect to any relevant proximity-base applications (services) in terms of the five proximity events set forth above. The server PRE preferably informs the proximity-based application of any state changes. Each event given to a proximity-based application will give the proximity-based application an opportunity to respond with new content to be offered to the client.

There is also a possibility that the server PRE can cache content that services are generating, for example, to support a scenario in which the same service can route content to the same client via different multiplexers. This scenario requires the client to be in two different, but overlapping spaces that happen to be managed by different multiplexers, both of which the same server is using to offer content.

C. Proximity-Based Applications

A server typically hosts a number of proximity-based applications. Each proximity-based application is preferably an implementation of a service to be offered to proximity-based clients. Each proximity-based application preferably has a prescribed interface for interacting with the server PRE. Each proximity-based application can also have other interfaces to allow access to non-proximity specific information (e.g., a hotel's registration database).

FIG. 5.1 illustrates an object model depicting part of an embodiment of a Server PRE and focuses on the relationship between services and the locations in which those services are offered. These concepts are discussed below and used to explain how the data necessary to generate the five proximity events gets from a multiplexer to a service.

In this embodiment, there are two different kinds of addressable locations (those locations at which a service can be targeted): location (proxies) and aggregate locations. A location (proxy) is a representation of a location that is available via a multiplexer. An aggregate location is some collection that groups location (proxies) from different multiplexers. It is not meant as a general purpose grouping mechanism to group location (proxies) from the same multiplexer in arbitrary fashions.

There is a one-to-one mapping between each service and the proximity-based application instance implementing the service. The service object is distinct, as there may be some state maintained on a per service basis. Services can be grouped into service groups, groups of services to be deployed to the same addressable location. Service groups can also be part of other service groups. Either services or service groups can be offered to addressable locations.

D. Proximity Event Propagation

The proximity event propagation starts with how events are received from a multiplexer. In this embodiment, the events are received at a location (proxy), that being the interface to a multiplexer from the Server PRE perspective. This event is passed on to all entities interested in the events of this location that can be an aggregate location, a deployable service, or both. Aggregate locations collect events from all addressable locations of which they are composed and form a new view. In general, if, and only if, a client is present in any addressable location within that aggregate location, it is also present in the aggregate location (a state model is not shown for this step). Aggregate locations likewise propagate events from their composed perspective to all entities interested in events of this location.

Either way, an event indicating that a client has been detected in some addressable location will be received by a deployable service. If this deployable service is a service, its actions are shown in FIG. 5.2. The received-events, Client Detected and Client Not Detected, are the only events that a service will receive. The service preferably transforms this information, together with accumulated state and timing parameters (.DELTA.t and timeout), into the five proximity events that are forwarded from a service to the proximity-based application instance it is representing. The .DELTA.t parameter represents how often the service informs the proximity-based application instance that the client is still present. It serves as a heartbeat of sorts and can serve as an opportunity for a proximity-based application instance to generate new content for a client (that is, the proximity-based application instance is permitted to generate content only in response to receiving one of the five events from a service).

If the deployable service is a service group, it preferably simply forwards any received events to all services and service groups that make up the service group. In reality, since each service or service group can be targeted to an arbitrary number of addressable locations, each needs to have a more complicated state model that collects events from a number of different sources and forms a new, composite state.

EXAMPLE

Figure 6:
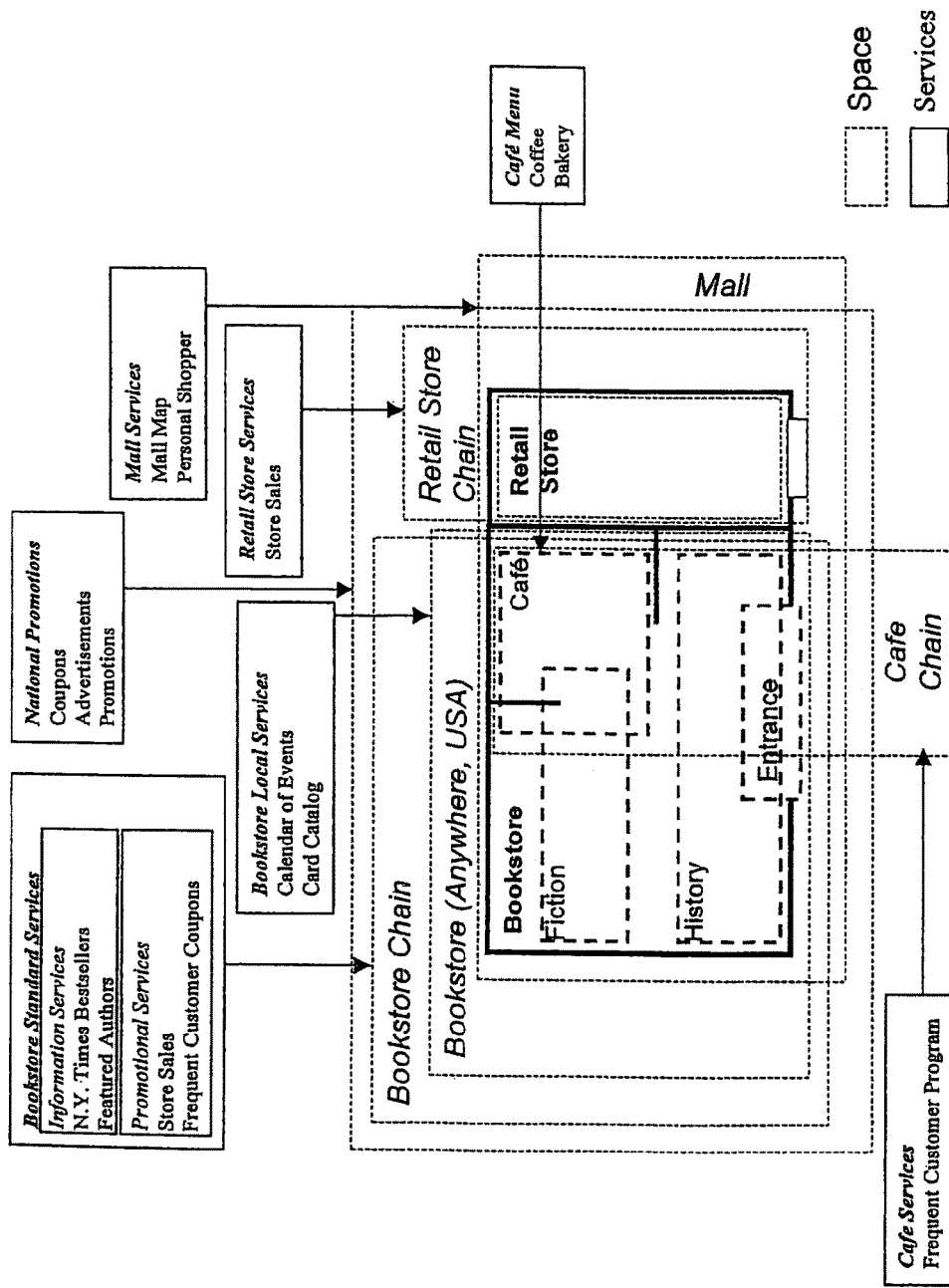
FIG. 6 illustrates an embodiment of the concepts of spaces aggregation.

FIG. 6 illustrates the concepts of space(s) aggregation in an environment specified by FIG. 1, and it includes a variety of services that are mapped to corresponding spaces. Further, FIG. 6 is sub-divided into FIG. 6.1 and FIG. 6.2. FIG. 6.1 illustrates the configuration of spaces and services in the Bookstore, which also contains a Caf. FIG. 6.2 illustrates the configuration of spaces and services in the adjacent Retail Store.

To provide services that are available to a customer anywhere in a particular Bookstore, one first creates a space corresponding to the entire store (see FIG. 6).

To cover the entire Bookstore, one creates an aggregate space, "Bookstore, Anywhere, USA," that contains all three Bookstore spaces: fiction, history and the caf. Collectively, these spaces define the aggregate space. When a customer is present within any one of these simple spaces, he is considered to be within the "Bookstore, Anywhere, USA" aggregate space, and all of the services targeted to the "Bookstore, Anywhere, USA" aggregate space will be available to him.

It would be ideal if the physical area covered by the three simple spaces in Bookstore corresponded perfectly to the area contained by the Bookstore, the history space corresponded perfectly with the history section, and the three spaces were distinct and non-overlapping. However, because of the limitations of detection technologies like Bluetooth™, it's very likely that in reality either these spaces will overlap at the edges, or there will be regions in the store that are not covered by a simple space. In general, spaces will be an approximation of a physical area. In practice, this means that it is possible that a customer standing on the threshold between the fiction section and the caf will have access to sets of services that are offered in either space.

In this Example, the Bookstore provides storewide services including a calendar of events a local card catalog that lists all the items currently in stock and their locations within the store. These are packaged as the "Bookstore Services" group and targeted to the "Bookstore, Anywhere, USA" aggregate space.

If one wanted to provide services that were specific to a particular area of the Bookstore one can target the services directly to the child (simple) spaces. For example, a menu could be targeted specifically to the Bookstore caf.

To target services to all of the Bookstore locations across the country, one can define a larger aggregate space corresponding to the entire Bookstore chain. In this example, services available to all stores within the Bookstore chain are packaged in the "Bookstore Standard Services" service group, which itself is composed of two service groups, "Information" and "Promotions".

By defining spaces to represent both the local Bookstore as well as the entire chain of Bookstores, one enables both location-specific services as well as services that are to be available across locations.

For the adjacent Retail Store (for example, a tie store) there may be no need for location-specific services. In this case the only services available are those tied to the aggregate space corresponding to all Retail Store outlets across the country.

The Bookstore Caf may actually be affiliated with two retailers—the Bookstore that houses the caf, as well as, for example, a national Caf chain. The Caf chain may also want to deliver services to its customers at this location. For example, the Caf chain may have a service to send coupons for free coffee to frequent customers For the Caf chain to provide its own services to the caf, one preferably creates an aggregate space that includes all of the Caf chain's locations. Once the space is created, the Caf chain can make services available to its locations across the country by associating service groups with the space.

The mall itself may want to offer services that are available throughout the mall. In this case, one can define an aggregate space composed of all locations within the mall, including the local Bookstore space (an aggregate itself) and the Retail Store space.

In the previous sections, all of the described services were provided by a retailer (e.g., Bookstore), or the owner of the physical area housing the retailer (e.g., the Mall). A space can also be used to host services provided by some third party. For example, stores like the Bookstore and the adjacent Retail Store can contract with a company (National Promotions) that brokers coupons, advertisements, and promotions for companies with complementary products. For a fee, the advertising broker National Promotions can target its services to these retailers' locations—either their entire chains or individual stores. In FIG. 6, the advertising broker is shown to target its services to the aggregate spaces representing the retailers' chains.

Figure 7:
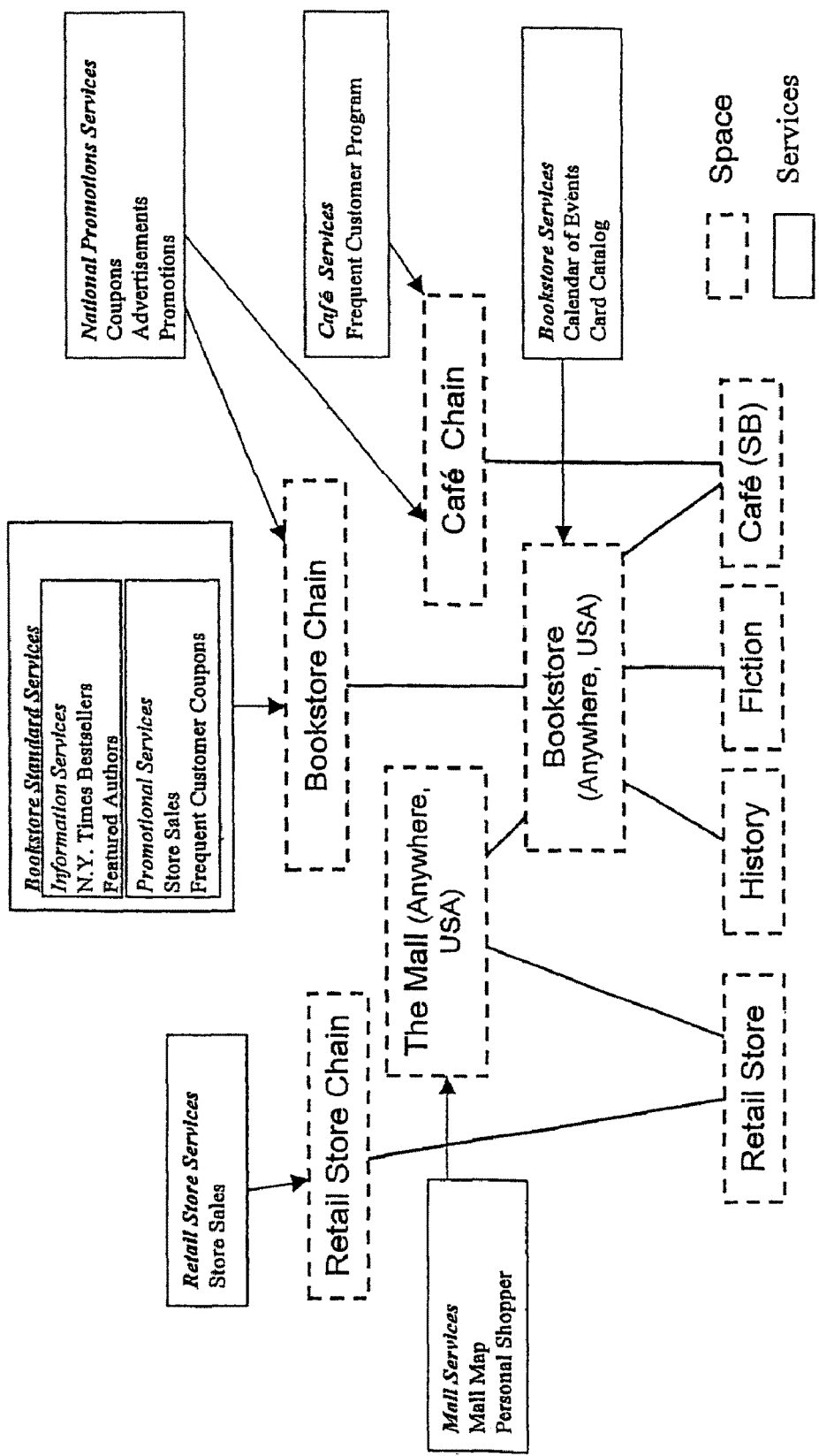
FIG. 7 illustrates a particular instantiation of the model set forth in FIG. 2, based on space and service group relationships specified in FIG. 6.

FIG. 7 illustrates a particular instantiation of the model set forth in FIG. 2, based on space and service group relationships specified in FIG. 6. The targeting of a service group to a space is shown with an arrow, while the hierarchy of spaces is shown with undecorated lines. For example, a user standing in the "Caf" space (see FIG. 1) is also considered to be present within the "Bookstore (Anywhere, USA)" space, "Bookstore", "Caf Chain" and "The Mall". All of the services targeted to these spaces may also be available to the user (see FIG. 6).

Assuming that a user is interested in all possible services available at a location, and the user is authorized to interact with all of them, the following services will be available within the caf space:

Bookstore Standard Services
Information
N.Y. Times Bestsellers
Featured Authors
Promotions
Store Sales
Frequent Customer Coupons
Caf Services
Frequent Customer Program
Bookstore Services
Calendar of Events
Card Catalog
Mall Services Mall Map
Personal Shopper
National Promotions
Coupons
Advertisements
Promotions A user might not, however, see all of the services targeted to a location. Services may be not be available because:

The user has specified that he is not interested in particular services or classes of services.

The user is not authorized to use the service (for example, he or she hasn't purchased a service option, does not have an account with the company offering the service, or hasn't met some other qualifying criteria).

The user was not included in the user group targeted by the service (e.g., certain promotions may be directed at a particular demographic).

Moreover, the way in which services are actually displayed to the user may also vary. Depending on the user's preferences and how services are classified, they may be displayed in a particular way.

Although the present invention has been described in detail in connection with the above examples, it is to be understood that such detail is solely for that purpose and that variations can be made by those skilled in the art without departing from the spirit of the invention except as it may be limited by the following claims.

The invention claimed is:

1. A system for delivery of services to at least one mobile client capable of wireless communication comprising:
   a plurality of communication/detection devices, each of said communication/detection devices capable of communicating with the at least one mobile client when the at least one mobile client is located within an associated physical area;
   at least one server programmed to host at least one service configured to provide content targeted for at least one physical area; and
   at least one multiplexer capable of communicating with at least one of the plurality of communication/detection devices to obtain a location of the at least one mobile device, and capable of communicating with the at least one server, the at least one multiplexer being configured to notify the at least one server when the at least one mobile client is located in the at least one physical area;
   wherein the at least one server is programmed to host at least one service configured to provide content targeted for an aggregate space defined by a set of at least two physical areas, and wherein the at least one multiplexer being configured to notify the at least one server when the at least one mobile client is located in at least one of the at least two physical areas represented by the aggregate space.

2. The system of claim 1, wherein each of said communication/detection devices, the multiplexer and the server are each present at separate locations.

3. The system of claim 1, wherein the at least one server is programmed to host at least one service group including at least one service, the at least one service group configured to provide related content targeted to the aggregate space.

4. The system of claim 1, wherein a first of the at least two physical areas defining the aggregate space overlaps with the associated physical area associated with a first of the plurality of communication devices and a second of the at least two physical areas defining the aggregate space overlaps with the associated physical area associated with a second of the plurality of communication devices.

5. The system of claim 4, wherein the aggregate space is associated with a particular business having a first facility located at least partially within a first of the at least two physical areas, and a second facility located at. least partially within a second of the at least two physical areas.

6. The system of claim 5, wherein the content targeted for the aggregate space includes at least one advertisement for the first facility and the second facility.

7. The system of claim 6, wherein the content targeted for the aggregate space includes at least one first advertisement for a first product and/or service located proximate the mobile client within the first of the at least two physical areas and at least one second advertisement for a second product and/or service located proximate the mobile client within the second of the at least two physical areas.

8. The system of claim 1, wherein a first of the at least two physical areas defining the aggregate space and a second of the at least two physical areas defining the aggregate space both overlap with the associated physical area associated with a first of the plurality of communication devices.

9. The system of claim 1, wherein the plurality of communication/detection devices, the multiplexer and the at least one server communicate over a network, and each of the plurality of communication/detection devices, the multiplexer and the at least one server are physically separate components connected at different locations on the network.

10. The system of claim 9, wherein each of the plurality of servers is adapted to provide the content targeted for the aggregate space over the network to the at least one multiplexer when the mobile client is located within at least one of the at least two physical areas represented by the aggregate space.

11. The system of claim 10, wherein the at least one multiplexer is configured to transfer content received from the plurality of servers to the at least one mobile client over the network via one of the plurality of communication/detection devices in communication with the at least one mobile client.

12. A method of providing services to a mobile client capable of wireless communication, the method comprising steps of:
   establishing a wireless connection between the mobile client and at least one of a plurality of communication/detection devices when the mobile client is located within a physical space associated with the at least one of the plurality of communication/detection devices; and
   communicating information obtained by the at least one of the plurality of communication/detection devices to at least one server programmed to host at least one service configured to provide content targeted to at least one physical area, the communication including a notification to the at least one server that the mobile client is located in the at least one physical area;
   wherein communicating information includes communicating information obtained by the at least one of the plurality of communication/detection devices to at least one server programmed to host at least one service configured to provide content targeted to an aggregate space defined by a set of at least two physical areas, the communication including a notification to the at least one server that the mobile client is located in at least one of the at least two physical areas represented by the aggregate space.

13. The method of claim 12, wherein the step of communicating the information obtained by the at least one of the plurality of communication/detection devices to the at least one server is performed by an intermediary device configured to receive information about a location of the mobile client from the at least one of the plurality of communication/detection devices and to notify the at least one server when the mobile client is located within at least one of the at least two physical areas represented by the aggregate space.

14. The method of claim 13, further comprising providing the content targeted for the aggregate space to the intermediary device in response to the at least one server being notified by the intermediary device that the mobile client is located within the at least one of the at least two physical areas represented by the aggregate space.

15. The method of claim 14, further comprising transferring the content from the intermediary device to the mobile client via the at least one of the plurality of communication/detection devices.

16. The method of claim 12, wherein the content targeted to the aggregate space includes at least one advertisement.

17. The method of claim 16, wherein the at least one advertisement relates to products and/or services proximate the location of the mobile client.

* * * * *